Aug. 31, 1965  W. K. GENTHE  3,203,241
FLOW MEASURING DEVICE
Filed Jan. 4, 1962  2 Sheets-Sheet 1

INVENTOR.
WILLIAM K. GENTHE
BY
ATTORNEY

Aug. 31, 1965　　W. K. GENTHE　　3,203,241
FLOW MEASURING DEVICE
Filed Jan. 4, 1962　　2 Sheets-Sheet 2

INVENTOR.
WILLIAM K. GENTHE
BY
ATTORNEY

United States Patent Office 3,203,241
Patented Aug. 31, 1965

3,203,241
FLOW MEASURING DEVICE
William K. Genthe, Menomonee Falls, Wis., assignor to Badger Meter Manufacturing Company, Milwaukee, Wis., a corporation of Wisconsin
Filed Jan. 4, 1962, Ser. No. 164,230
12 Claims. (Cl. 73—228)

This invention relates to devices utilized in making measurements of a flowing medium and, more particularly, to a volumetric flow measuring device.

Volumetric flow measurement is presently accomplished by a variety of mechanisms utilizing such elements as venturi tubes, orifice plates, nozzles, pitot tubes and electromagnetic elements as the flow sensing members. Experience has shown that performance of mechanisms of this type is inaccurate and erratic where non-homogeneous mediums such as solid-liquid or gas-liquid slurries or gas-solid suspensions are being measured and these mechanisms require direct contact with the flowing medium making them unsanitary and subject to undesirable deposits and clogging. Furthermore, the pressure sensing flow measuring elements are slow in responding to transients in flow rate. Obviously, although these are the most commonly used flow measuring mechanisms, none provides universally satisfactory performance.

Accordingly, it is a general object of this invention to provide a relatively simply constructed and yet effective flow measuring device.

Another object of this invention is to provide a flow measuring device which is equally well suited for use with homogeneous and non-homogeneous mediums, is sanitary, and is not subject to clogging or deposits.

A further object of this invention is to provide a flow measuring device having a practically instantaneous response to transients in flow rate.

For the accomplishment of these objects this invention contemplates the utilization of the magnetostrictive properties of certain metals, or alloys of those metals, in a volumetric flow measuring device. More specifically, magnetostrictive elements are associated with a portion of a conduit, the conduit being subject to forces resulting from the flow of a particular medium through the conduit and in such a manner as to exert a force on the magnetostrictive element in accordance with the flow rate of the medium. The force so exerted is then translated, through the magnetostrictive properties of the elements, into a corresponding electrical signal.

This invention will be discussed in relation to a volumetric flow measurement device wherein the average flow density of the medium being measured is known and wherein the force exerted on the magnetostrictive element, or elements, is proportional to the square of the volumetric flow rate. This force is then suitably translated into a signal which is proportional to the square of the volumetric flow rate. However, it should be understood that this invention is not limited to use in a volumetric flow measuring device but will have wider application; for example, it can be used equally well in a mass flow measuring device wherein either the density or the volumetric flow rate will be known quantities and the force exerted on the magnetostrictive element, or elements, will be proportional to the square of mass flow rate.

The novel features of this invention are set forth in the appended claims. The invention itself, together with additional objects and advantages thereof, will be more clearly understood from a reading of the following description in connection with the accompanying drawings wherein a preferred embodiment of the invention has been illustrated and in which:

Figure 1:
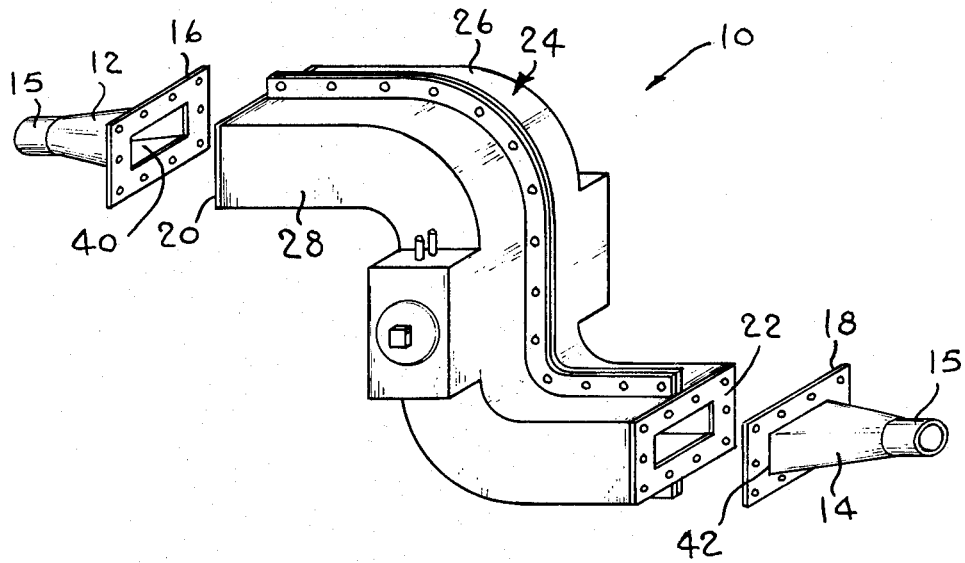
FIG. 1 is a perspective view of the flow measuring device.

Referring now to the drawings, a flow measuring device 10 is adapted to be connected between ends 12 and 14 of a conduit 15 having a fluid flowing therethrough. Ends 12 and 14 include flanges 16 and 18 which are clamped to flanges 20 and 22 of measuring device 10 to provide a sealed, fluid-tight connection. Measuring device 10 includes an outer housing 24 made up of two abutting sections 26 and 28 which are also suitably joined so as to provide a sealed, fluid-tight chamber 30 (see FIG. 5) which is filled with oil or other suitable liquid. Housing 24 is securely clamped in and fixed relative to the conduit 15.

Housing 24 is generally S-shaped and encloses an S-tube 32 through which fluid flows between ends 12 and 14. The S-tube comprises relatively offset ends 34 and 36 connected by a center portion 38, ends 34 and 36 being generally parallel and center portion 38 extending generally transversely of the ends. Arcuate portions 39 connect the center portion 38 to the ends.

Figure 5:
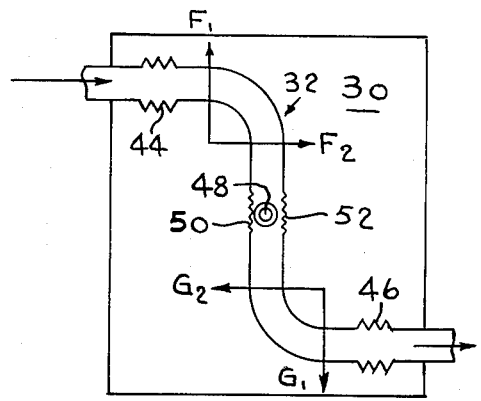
FIG. 5 is a schematic of the flow measuring device.

The flow measuring device will function as a result of fluid flow in either direction but for the purpose of description a flow from left to right, as viewed in the drawings, will be assumed so that flange 16 includes an inlet opening 40 and flange 18 includes an outlet opening 42. A bellows 44 connects end 34 to flange assembly 20 and correspondingly to inlet opening 40 and a bellows 46 connects end 36 to flange assembly 22 and correspondingly to outlet opening 44, again these are fluid-tight connections. Flange assemblies 20 and 22 are fixed relative to ends 12 and 14 and housing 24 whereas S-tube 36, as a result of the flexible connection provided by bellows 44 and 46, is movable within housing 24. With reference to FIG. 5 and in a manner to be described more completely hereinafter, the S-tube is connected at its midpoint to housing 24, this connection forming an axis 48 about which the S-tube is rotatable. The S-tube is then flexibly mounted in the conduit for rotation about axis 48 in accordance with fluid flow through the measuring device 10. More particularly, fluid flowing through the measuring device undergoes two changes in direction in the S-tube producing forces acting on the S-tube. These forces are resolved into forces $F_1$ and $F_2$ and $G_1$ and $G_2$ acting about the center of curvature of portions 39. Forces $F_1$ and $G_1$ cancel but forces $F_2$ and $G_2$ are additive and produce a couple acting about axis 48 and tending to rotate the S-tube in a clockwise direction. If an elongated member such as a rod were attached to the S-tube at axis 48 and held against rotation and for a constant average flow density and, preferably, where the pressure $P_c$ of the oil in chamber 30 is equal to the arithmetic average of pressure $P_i$ and $P_o$ at inlet 40 and outlet 42, respectively, the torsional force acting on the rod would be proportional to the square of the volumetric flow rate of the fluid passing through the S-tube.

Any one of a number of methods can be used to regulate the pressure in chamber 30, one example is illustrated in the drawings. More particularly, diaphragms 50 and 52 are provided at the center of and on opposed sides of the S-tube. Due to the general symmetry of the S-tube with respect to axis 48, the pressure drop across each half of the S-tube is substantially equal so that the pressure at the center of the S-tube is essentially the average of pressures $P_i$ and $P_o$. Diaphragms 50 and 52 impart this pressure to the fluid filled chamber 30 so that pressure $P_c$ is equal to the arithmetic average of pressures $P_i$ and $P_o$. Another method is to fill chamber 30 with the flowing fluid medium and provide ports at the center of the S-tube, or at the inlet and outlet so as to connect chamber 30 directly to the interior of the S-tube.

In the preferred embodiment, S-tube 32 is rectangular in transverse cross-section, however, it should be understood that other configurations may be used as desired without departing from the scope of this invention. With the rectangular cross-section, the minor dimension is preferably no larger than one-fifth of the major dimension. This flattens the S-tube and minimizes variations in effective bend radius due to the formation of eddies in the flow stream or due to the separation of flow stream components having different densities in multi-phase or multi-components mixtures.

Figure 2:
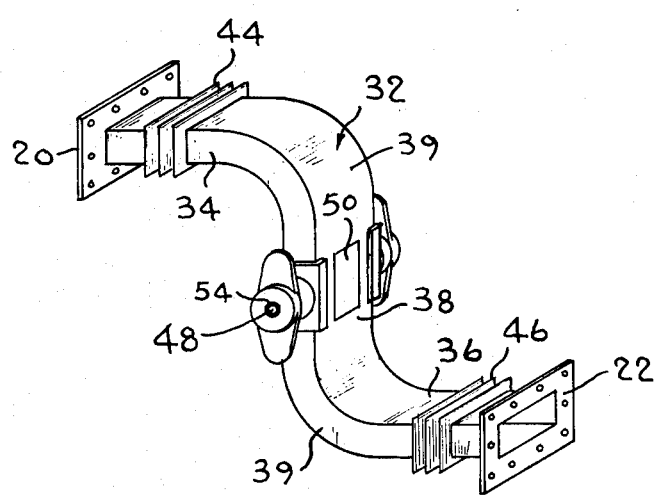
FIG. 2 is a perspective view of the S-tube assembly.
Figure 3:
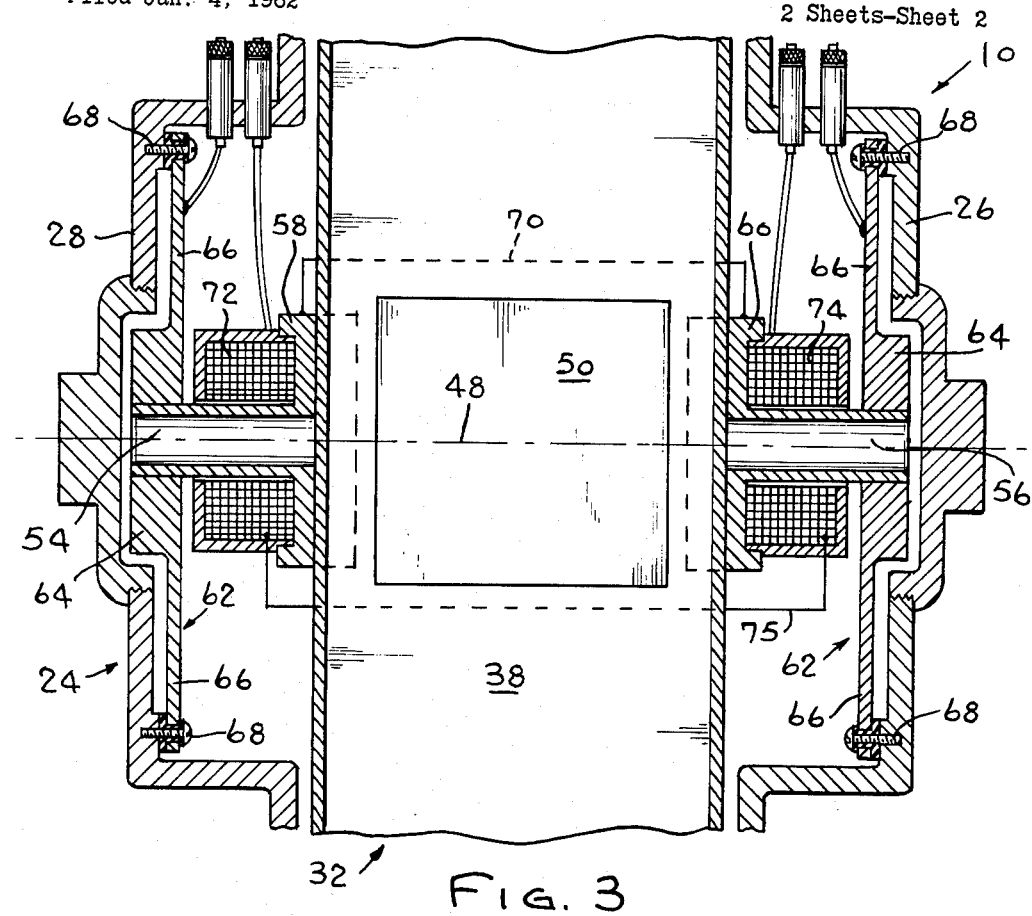
FIG. 3 is a partial section view along the axis of the flow measuring device.

With particular reference now to FIGS. 2 and 3, tubes 54 and 56 are provided with channel shaped portions 58 and 60, respectively, which fit over and are suitably secured to opposed sides of the S-tube. Tubes 54 and 56 are supported at their free ends by identical expansion isolators 62 each of which includes a split hub 64 clamped onto the tube end and arms 66 extending from each half of hub 64 to be fastened to housing 24 by screws 68. The expansion isolators hold the tubes against rotation but permit axial movement of the tubes to prevent a build-up of compressive or tension forces within the tube as a result of expansion or contraction. Tubes 54 and 56 are positioned at the center of S-tube 32 so as to become the axis of rotation 48 of FIG. 5, and, being held against rotation, the couple produced by forces $F_2$ and $G_2$ and tending to rotate the S-tube exerts a torsional force on the tubes twisting them about their respective axis.

As was stated above, this torsional force is proportional to the square of the volumetric flow rate through the S-tube. To utilize this torsional force and produce a signal corresponding to the volume of fluid flowing through the S-tube, tubes 54 and 56 are made of magnetostrictive material, for example, iron, nickel, or cobalt and most of their alloys.

Figure 4:
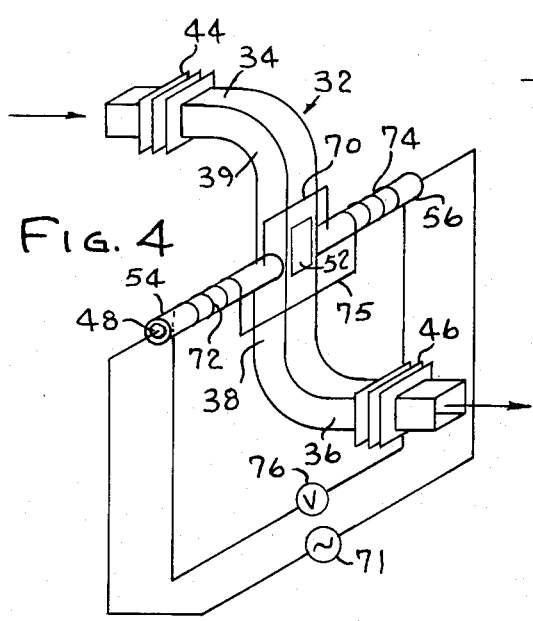
FIG. 4 is a schematic of the S-tube assembly.

Referring to FIG. 4, tubes 54 and 56 are connected in series by a conductor 70 and are supplied with electrical current from an electrical source 71. Coils 72 and 74 are wound on tubes 54 and 56 respectively and are connected by conductor 75 in series circuit relationship with a suitable meter 76. The current flowing through tubes 54 and 56 produces a circular magnetic field about the tubes, and, due to the phenomenon known as the inverse Wiedemann effect, an axial or longitudinal magnetic field is produced with respect to the tubes when they are twisted. The combination of the circular and longitudinal magnetic fields produces a helical field having both a circumferential and an axial component, in other words, when a current carrying tube of magnetostrictive material is twisted the usual circular magnetic field surrounding the tube is skewed to a helical field. The axial component of the skewed field links the coils wound on each tube and induces a voltage in the coils which is proportional to the torsional force applied to the tube. Since the axial components of the field around each of the tubes are opposite in direction the coils are oppositely wound so that the voltages induced therein are additive and do not cancel each other out. The read-out on meter 76 is then directly related to the square of the volume of fluid medium flowing through the S-tube per unit time and can, by proper computation, be transformed to gallons per second. If desired and since the induced voltage is proportional to the square of the volumetric flow rate, the square root of the voltage can be extracted by well known servo analog techniques and integrated to give a direct reading in gallons per second.

Variations from the preferred embodiment are possible without departing from the scope of this invention, however, the use of the inverse Wiedemann effect results in a simple and relatively economical structure. Furthermore, another advantage of using the inverse Wiedemann effect is that torque variations, and correspondingly variations in volumetric flow, are sensed and measured practically instantaneously since the voltage output of the coils is affected only by the torsional force acting on the magnetostrictive tubes and these stresses are propagated through the magnetostrictive materials at the velocity of sound.

One possible alternative to passing current through the magnetostrictive tube and inducing a voltage in coils wound on the tubes is to pass a current through the coils. This places the magnetostrictive tubes in a longitudinal magnetic field, and when twisted a voltage differential occurs across the ends of the tube. For an alternating current in the coils, the voltage differential will be steady and alternating for a given torque. This is known as the second inverse Wiedemann effect and the voltage so induced is again proportional to the torsional force applied to the magnetostrictive tubes which in turn is proportional to the square of the volumetric flow rate through the S-tube. Measurement of the voltage and suitable conversion, as explained above, will give a read-out in gallons per second.

Although the magnetostrictive members have been illustrated as tubular elements which are subjected to a torsional force, it should be understood that variations are possible without departing from the scope of this invention, by way of example magnetostrictive rods could be substituted for the tubular elements. However, the use of tubular elements is particularly desirable in that it permits still additional variations, all of which fall within the scope of this invention. For example, with respect to the tubular magnetostrictive elements an axial magnetic field can be produced by current carrying conductors wound on the elements and, when the elements are twisted, a voltage induced in conductors threaded in the tubular elements; or a cylindrical field could be generated by passing a current through conductors threaded in the tubular elements and the induced voltage picked up by coils wound on the elements. It is appreciated that with the benefit of this description, still additional variations of this invention will become apparent to those skilled in the art and it should be understood that the discussion and illustration of this invention with respect to a particular preferred embodiment thereof has been intended for illustrative purposes only and should not be taken by way of limitation. Accordingly, it is intended in the appended claims to cover all modifications and embodiments of this invention as fall within the true spirit and scope thereof.

What I claim is:

1. A measuring device adapted to be connected in a conduit having a fluid flowing therethrough and comprising, in combination, a generally S-shaped member having inlet and outlet portions, means flexibly connecting said inlet and outlet portions to said conduit for fluid flow therethrough, means supporting said S-shaped member for pivotal movement in response to said fluid flow, an elongated magnetostrictive member having one end connected with said S-shaped member for movement therewith and means connected to the other end of said magnetostrictive member for holding said magnetostrictive member against movement with said S-shaped member and arranged so that fluid flowing through said S-shaped member exerts a rotational force on said S-shaped member and a torsional force is exerted on said magnetostrictive member in accordance with fluid flow through said S-shaped member, means for generating a generally circular magnetic field relative to said magnetostrictive member, and electrically conductive means electrically associated with said magnetostrictive member so that an electrical signal is induced in said electrically conductive means by said torsional force and proportional to the square of said flow.

2. A measuring device adapted to be connected in a conduit having fluid flowing therethrough comprising, in combination, a movable member having a configuration which will cause the fluid flowing therethrough to change direction as it flows through said movable member, means flexibly connecting said movable member to said conduit to define a portion of the flow path for said fluid and supporting said movable member for rotation in response to said change of direction of fluid flow, a magnetostrictive member, means connecting said magnetostrictive member to said movable member for rotation in response to rotation of said movable member, means holding said magnetostrictive member against rotation with said movable member so that a torsional force is exerted on said magnetostrictive member proportional to the square of said flow, an electrical coil wound on said magnetostrictive member, and means for passing an electrical current through one of said magnetostrictive member and said coil so that an electric signal is generated in the other of said magnetostrictive member and said coil proportional to the square of said flow of fluid.

3. The combination of claim 2 wherein said movable member includes at least two portions arranged at an angle to each other to cause a change in direction of flow of fluid flowing through said movable member, and wherein said means supporting said movable member for rotation supports said movable member at a point spaced from the point at which said fluid changes direction to thereby achieve rotation of said movable member in response to said change in direction of said fluid flow.

4. The combination of claim 2 wherein said current is passed through said magnetostrictive member and said signal is generated in said coil.

5. A measuring device adapted to be connected in a conduit having a fluid flowing therethrough and comprising, in combination, a generally S-shaped member having inlet and outlet portions flexibly connected to said conduit and supported for pivotal movement in response to fluid flow therethrough, an elongated magnetostrictive member connected at one end to said S-shaped member and positioned at the pivotal axis thereof, means engaging the other end of said magnetostrictive member for holding said magnetostrictive member against rotation whereby fluid flowing through said S-shaped member tends to rotate said S-shaped member with respect to and exerts a torsional force on said magnetostrictive member, an electric coil wound on said magnetostrictive member, and means for passing an electric current through said magnetostrictive member.

6. The combination of claim 5 wherein said measuring device further includes a fluid filled outer housing and means for maintaining the pressure of the fluid in said outer housing substantially equal to the average of the pressure at the inlet and outlet portion of said S-shaped member.

7. The combination of claim 6 wherein said pressure maintaining means comprises at least one flexible diaphragm included in said S-shaped member and communicating between the interior of said S-shaped member and said fluid, said diaphragm being located at the mid-point of said S-shaped member.

8. A measuring device adapted to be connected in a conduit having a fluid flowing therethrough and comprising, in combination, a generally S-shaped member flexibly connected in said conduit with said fluid flowing therethrough and having a generally rectangular transverse cross-section, an elongated magnetostrictive member connected at one end to and defining an axis of rotation for said S-shaped member, means engaging the other end of said magnetostrictive member and holding said magnetostrictive member against rotation whereby fluid flowing through said S-shaped member tends to rotate said S-shaped member with respect to and exerts a torsional force on said magnetostrictive member, an electric coil wound on said magnetostrictive member, and means for passing an electric current through said magnetostrictive member.

9. The combination of claim 8 wherein the ratio of width to length of said rectangular conduit in transverse cross-section is not greater than one to five.

10. A measuring device comprising, in combination, a pressure chamber having relatively offset inlet and outlet passages, an S-shaped rectangular in transverse cross-section conduit having its ends flexibly connected to each of said inlet and outlet passages, a pair of rods of magnetostrictive material attached at opposed points on said S-shaped conduit, means connecting said rods in said chamber for axial movement and against rotation so that said rods provide an axis about which said S-shaped conduit is rotatable, said rods electrically interconnected and connected to a source of electricity, and an electrical conductor oppositely wound on each of said rods and connected to means for measuring the electrical variations in said coil due to torsional forces applied to said rod upon movement of said S-shaped conduit.

11. The combination of claim 10 wherein a pair of oppositely arranged diaphragms are provided at the center of said S-shaped conduit.

12. The combination of claim 11 wherein the ratio of width to length of said rectangular conduit in transverse cross-section is not greater than one to five.

References Cited by the Examiner

UNITED STATES PATENTS

| | | | |
|---|---|---|---|
| 1,581,957 | 4/26 | Keller. | |
| 2,538,785 | 1/51 | Karig | 73—211 X |
| 2,804,771 | 9/57 | Brown | 73—228 |
| 2,895,331 | 7/59 | Dahle | 73—136 |
| 2,897,672 | 8/59 | Glasbrenner et al. | 73—194 X |
| 2,977,791 | 4/61 | Dubsky et al. | 73—136 X |
| 3,039,044 | 6/62 | Dubsky et al. | |

FOREIGN PATENTS 157,135    12/56    Sweden.

RICHARD C. QUEISSER, *Primary Examiner.*

ROBERT L. EVANS, *Examiner.*